(12) United States Patent
Kanazawa et al.

(10) Patent No.: US 9,643,495 B2
(45) Date of Patent: May 9, 2017

(54) PANTOGRAPH DEVICE OF TROLLEY TRUCK

(71) Applicants: HITACHI POWER SOLUTIONS CO., LTD., Ibaraki (JP); HITACHI CONSTRUCTION MACHINERY CO., LTD., Tokyo (JP)

(72) Inventors: Hiroyuki Kanazawa, Hitachi (JP); Shinji Akino, Tsuchiura (JP); Toshio Shikama, Sayama (JP)

(73) Assignees: HITACHI POWER SOLUTIONS CO., LTD., Ibaraki (JP); HITACHI CONSTRUCTION MACHINERY CO., LTD., Tokyo (JP)

( * ) Notice: Subject to any disclaimer, the term of this patent is extended or adjusted under 35 U.S.C. 154(b) by 174 days.

(21) Appl. No.: 14/403,622

(22) PCT Filed: Mar. 21, 2013

(86) PCT No.: PCT/JP2013/058022
§ 371 (c)(1),
(2) Date: Nov. 25, 2014

(87) PCT Pub. No.: WO2013/179740
PCT Pub. Date: Dec. 5, 2013

(65) Prior Publication Data
US 2015/0136555 A1   May 21, 2015

(30) Foreign Application Priority Data

May 31, 2012 (JP) .................................. 2012-125118

(51) Int. Cl.
*B60L 5/24* (2006.01)
*B60L 5/28* (2006.01)
(Continued)

(52) U.S. Cl.
CPC ...... *B60L 5/24* (2013.01); *B60L 5/26* (2013.01); *B60L 5/28* (2013.01); *B60L 5/30* (2013.01);
(Continued)

(58) Field of Classification Search
CPC ...... B60L 5/00; B60L 5/18; B60L 5/19; B60L 5/20; B60L 5/22; B60L 5/24; B60L 5/28; B60L 5/30; B60L 5/32
See application file for complete search history.

(56) References Cited

U.S. PATENT DOCUMENTS 4,745,997 A    5/1988  Takei et al.
6,591,953 B2 * 7/2003  Blanvillain ............... B60L 5/22
                                                    191/57

FOREIGN PATENT DOCUMENTS

GB    1342352 A    1/1974
JP    33-17407 Y1  10/1958
(Continued)

OTHER PUBLICATIONS

Japanese Office Action received in corresponding Japanese Application No. 2014-518310 dated Sep. 8, 2015.
(Continued)

*Primary Examiner* — R. J. McCarry, Jr.
(74) *Attorney, Agent, or Firm* — Mattingly & Malur, PC

(57) ABSTRACT

A pantograph device of a trolley-type truck includes: a base frame; a bottom frame rockably attached to the base frame; a top frame rockably attached to the vicinity of the top end portion of the bottom frame through a connecting shaft; a collector shoe rockably supported in proximity to the top end portion of the top frame; a hydraulic cylinder for raising and lowering the bottom frame, attached to the base frame; and a spring which acts so as to rotate the top frame upward through the connecting shaft. By erecting the bottom frame by the hydraulic cylinder, the tensile force produced in the (Continued)

spring is increased and the top frame is rotated upward through the connecting shaft. This makes it possible to obtain a wide movable range without use of a long and strong spring and enhance the followability to overhead wires without increasing pressing force.

13 Claims, 9 Drawing Sheets

(51) Int. Cl.
  *B60L 9/00* (2006.01)
  *B60L 11/08* (2006.01)
  *B60L 5/26* (2006.01)
  *B60L 5/30* (2006.01)

(52) U.S. Cl.
  CPC .............. *B60L 9/00* (2013.01); *B60L 11/08* (2013.01); *B60L 2200/26* (2013.01); *B60L 2200/36* (2013.01); *B60L 2220/12* (2013.01); *B60L 2270/145* (2013.01); *Y02T 10/70* (2013.01); *Y02T 10/7077* (2013.01)

(56) References Cited

FOREIGN PATENT DOCUMENTS

| | | |
|---|---|---|
| JP | 60-181104 U | 12/1985 |
| JP | 63-035102 A | 2/1988 |
| JP | 8-182108 A | 7/1996 |
| JP | 08-331702 A | 12/1996 |
| JP | 2002-067776 A | 3/2002 |
| JP | 2010-203531 A | 9/2010 |
| WO | 2011/135870 A1 | 11/2011 |

OTHER PUBLICATIONS

International Searching Authority, International Search Report, Received in International Application No. PCT/JP2013/058022, mailed Apr. 16, 2013, with English Translation.

\* cited by examiner

PANTOGRAPH DEVICE OF TROLLEY TRUCK

TECHNICAL FIELD

The present invention relates to pantograph devices of trolley-type trucks used for ore transportation or the like at large-scale mines and in particular to a pantograph device of a trolley-type dump truck that can suitably travel in either a trolley mode for traveling on power obtained from an overhead wire or a non-trolley mode for traveling without obtaining power from an overhead wire, that is, on power obtained by driving a generator with an engine or the like.

BACKGROUND ART

Pantograph devices of trolley-type trucks are described in Japanese Patent Application Laid-Open No. 63-35102 (Patent Literature 1), Japanese Patent Application Laid-Open No. 2002-67776 (Patent Literature 2), and the like.

Patent Literature 1 describes a dump truck used for ore transportation at large-scale mines. According to the description, the dump truck travels by a generator driven by an engine in a non-trolley mode; and the dump truck collects a current from a double-track type overhead wire by a pair of pantographs mounted thereon and travels on utility power in a trolley mode. Patent Literature 1 also describes an invention for urgently causing the pantographs to descend when the pantographs are detached from an overhead wire.

Patent Literature 2 describes a trolley-type truck driven by driving drive motors on power from a current collector. This trolley-type truck is mounted with an engine generator that is started and can drive the drive motors when power supply from an overhead wire cannot be obtained. Patent Literature 2 also describes an invention in which a rocking arm (pantograph) is rocked and energized upward through a link arm and a coil spring to press a current collecting roller against an overhead wire; and when not in use, the rocking arm is pulled down by rewinding a rope coupled to the top end thereof on a hoisting winch.

CITATION LIST

Patent Literature

PTL 1: Japanese Patent Application Laid-Open No. 63-35102
PTL 2: Japanese Patent Application Laid-Open No. 2002-67776

SUMMARY OF THE INVENTION

Technical Problem

In the invention in Patent Literature 1, the pantographs are caused to ascend and descend by an air cylinder through a link mechanism. In case of trolley-type trucks used for ore transportation at large-scale mines or the like, ores are loaded and transported on the bed of a dump truck; therefore, overhead wires are installed in a position considerably higher than the vehicle of the dump truck. For this reason, a problem arises with respect to the pantographs installed on the deck at the upper front part of the vehicle to collect a current from the overhead wires. The distance from a position where the pantographs are folded to the maximum working height in the working range in which the collector shoes thereof are constantly in contact with the overhead wires and can collect a current is increased. (Hereafter, this distance will be referred to as the movable range of a pantograph.) In case of pantographs for electric trains, the movable range is small and only has to be approximately 1 m or less, for example. The movable range of pantographs for dump trucks is required to be, for example, approximately three times that of pantographs for electric trains or more. For this reason, the pantographs for dump trucks are increased in size and weight.

For this reason, the following problem is involved in the pantographs that are caused to ascend and descend by an air cylinder as described in Patent Literature 1: it is necessary to use an air cylinder with a long stroke and to obtain large push-up force; as a result, a large air cylinder is required. Since the pantographs are increased in size, the movable parts thereof are also increased in weight and this poses a problem of difficulty in the improvement of the followability to overhead wires.

In the invention in Patent Literature 2, a rocking arm (pantograph) is rocked and energized upward through a link arm and a coil spring and is thereby pressed against an overhead wire; and a rope coupled to the top end of the rocking arm is rewound by a hoisting winch and is thereby pulled down. When the movable range of the pantograph is large, a long coil spring that delivers strong spring force is required for the coil spring for causing the pantograph (rocking arm) to ascend and thus it is required to use a large coil spring. The hoisting winch is also required to overcome the strong spring force of the coil spring to cause the pantograph to descend; therefore, a large winch is also necessary. In addition, since the strong spring is used to press the pantograph against an overhead wire, the pressing force is also prone to be too large.

It is an object of the present invention to obtain a pantograph device of a trolley-type truck in which it is possible to obtain a large movable range without use of a long and strong spring and to enhance the followability to overhead wires without increasing the pressing force against overhead wires.

Solution to Problem

To achieve the above object, the present invention is a pantograph device of a trolley-type truck, mounted on a truck. The truck can travel in either a trolley mode in which the truck travels on power obtained from an overhead wire or a non-trolley mode in which the truck travels without obtaining power from an overhead wire. The pantograph device includes: a base frame; a bottom frame rockably attached to the base frame; a top frame rockably attached to the vicinity of the top end portion of the bottom frame through a connecting shaft; a collector shoe rockably supported in proximity to the top end portion of the top frame; an actuator for erecting and lowering the bottom frame, attached to the base frame; and a spring one end side of which is connected to the base frame side, the other end side of which is connected to the base end portion side of the top frame, and which acts to rotate the top frame upward through the connecting shaft. The bottom frame is erected by the actuator to increase the tensile force produced in the spring and the top frame is thereby rotated upward through the connecting shaft.

Advantageous Effects of the Invention

According to the present invention, a pantograph device of a trolley-type truck can be obtained in which pantograph device a large movable range can be obtained without use of a long and strong spring and the followability to an overhead wire can be enhanced without increasing the pressing force against the overhead wire.

DESCRIPTION OF EMBODIMENTS

Hereafter, a description will be given to concrete embodiments of the present invention with reference to the drawings. In each of the following drawings, items marked with identical reference signs indicate identical or equivalent items.

Embodiment 1

A description will be given to a pantograph device of a trolley-type truck in Embodiment 1 of the present invention with reference to FIG. 1 to FIG. 11.

Figure 1:
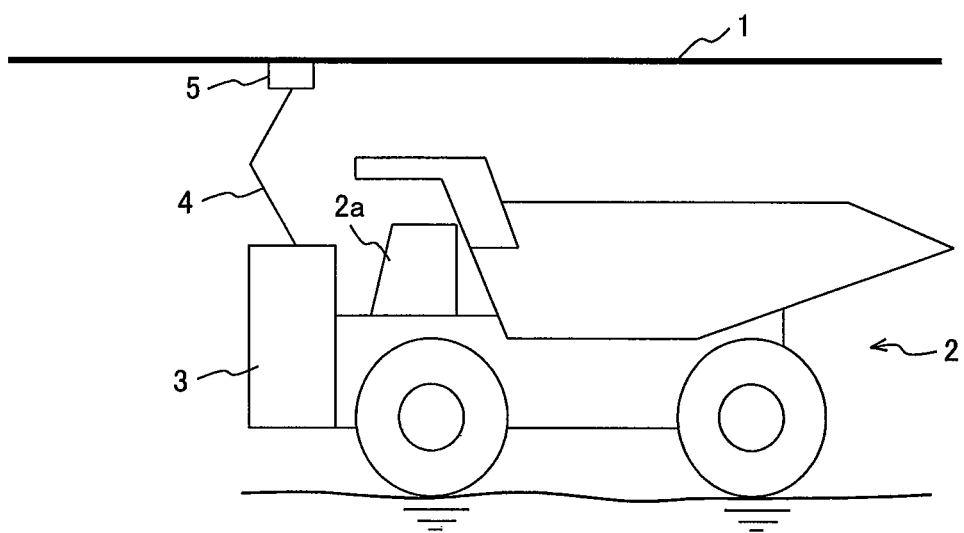
FIG. 1 is an overall schematic configuration diagram of a trolley-type truck in Embodiment 1 in which the present invention is applied.

FIG. 1 is an overall schematic configuration diagram of the trolley-type truck in Embodiment 1 in which the present invention is applied.

In the description of this embodiment, a trolley-type dump truck used for ore transportation or the like at large-scale mines will be taken as an example.

In FIG. 1, Reference sign 1 denotes an overhead wire (trolley wire) suspended over a track at a mine; and 2 denotes a trolley-type dump truck. This dump truck 2 is an electrically driven dump truck that can travel in either a trolley mode or a non-trolley mode. In the trolley mode, the truck travels on power obtained from the overhead wire 1; and in the non-trolley mode, the truck travels on power obtained by driving a generator with an engine. In this embodiment, the trolley mode and the non-trolley mode are always selectively used. Especially, in climbing a slope, the dump truck travels in the trolley mode and uses power obtained from the overhead wire 1 for the enhancement of the slope climbing speed. When the dump truck is used in an environment, such as a steep slope, in which large power is required, the dump truck may be so configured that power obtained from an overhead wire 1 and power obtained by an engine are simultaneously used.

When the engine (usually, a diesel engine) is used to drive the generator for traveling, an AC driving method is adopted. In this method, electricity obtained from the generator is controlled with control equipment, such as an inverter, and then an alternating-current (AC) motor (induction motor) is driven for traveling.

Adoption of an IGBT (Insulated Gate Bipolar Transistor) inverter and a grid resistor makes it possible also to deliver stronger electric brake force.

The dump truck 2 is mounted at the upper part thereof with the pantograph device 4 including an ascending/descending pantograph. Specifically, a deck 3 for mounting the pantograph is installed at the front part of the dump truck 2; and the pantograph device 4 for collecting a current from the overhead wire 1 is installed at the upper part of the deck 3 (the upper front part of the driver's cab 2a). Reference sign 5 denotes a collector shoe located at the upper part of the pantograph device 4 and the collector shoe slides in contact with the overhead wire 1 and collects electricity from the overhead wire 1.

Figure 2:
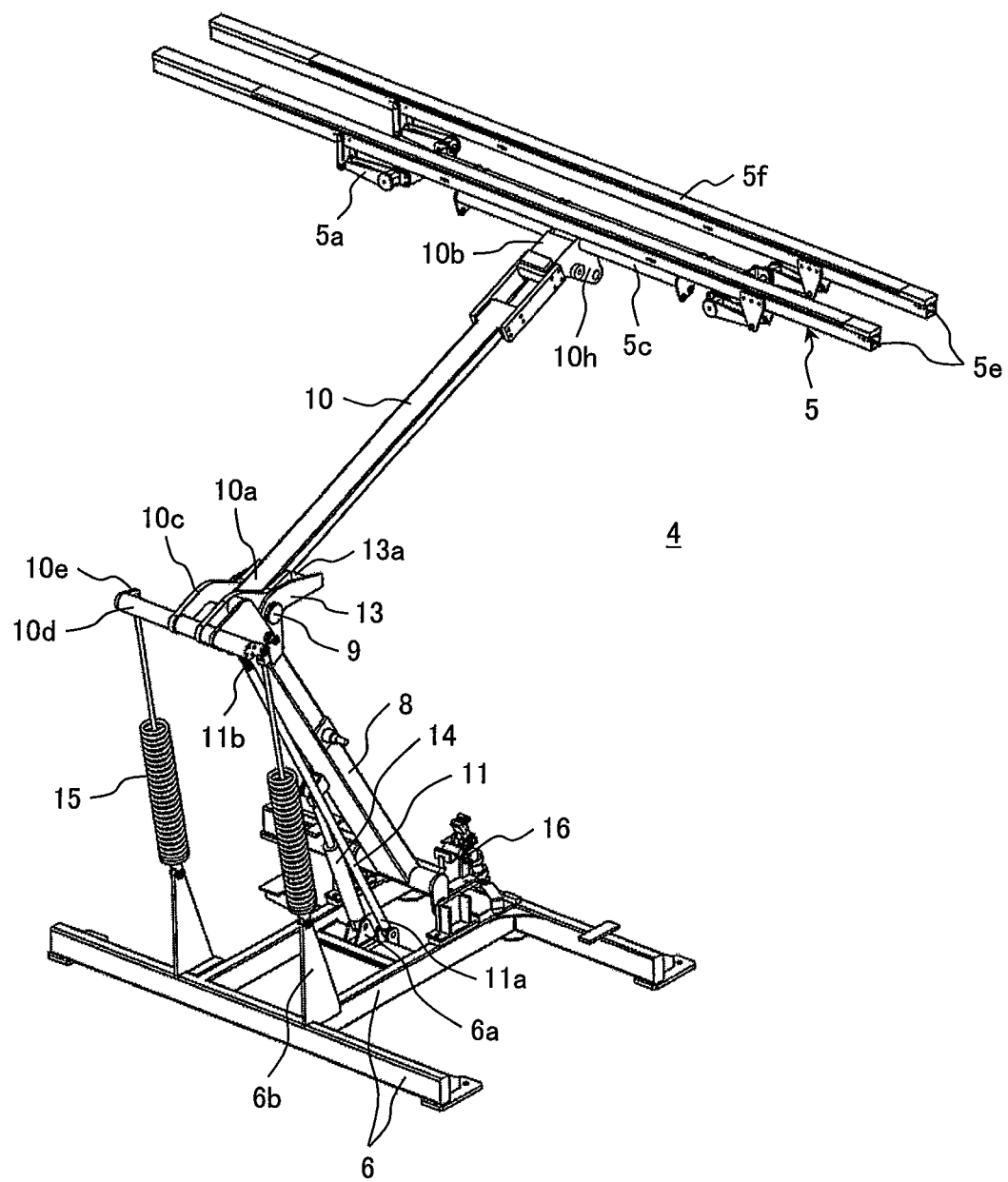
FIG. 2 is an overall perspective view of a pantograph device mounted on the trolley-type truck shown in FIG. 1, as viewed from the left front side.
Figure 3:
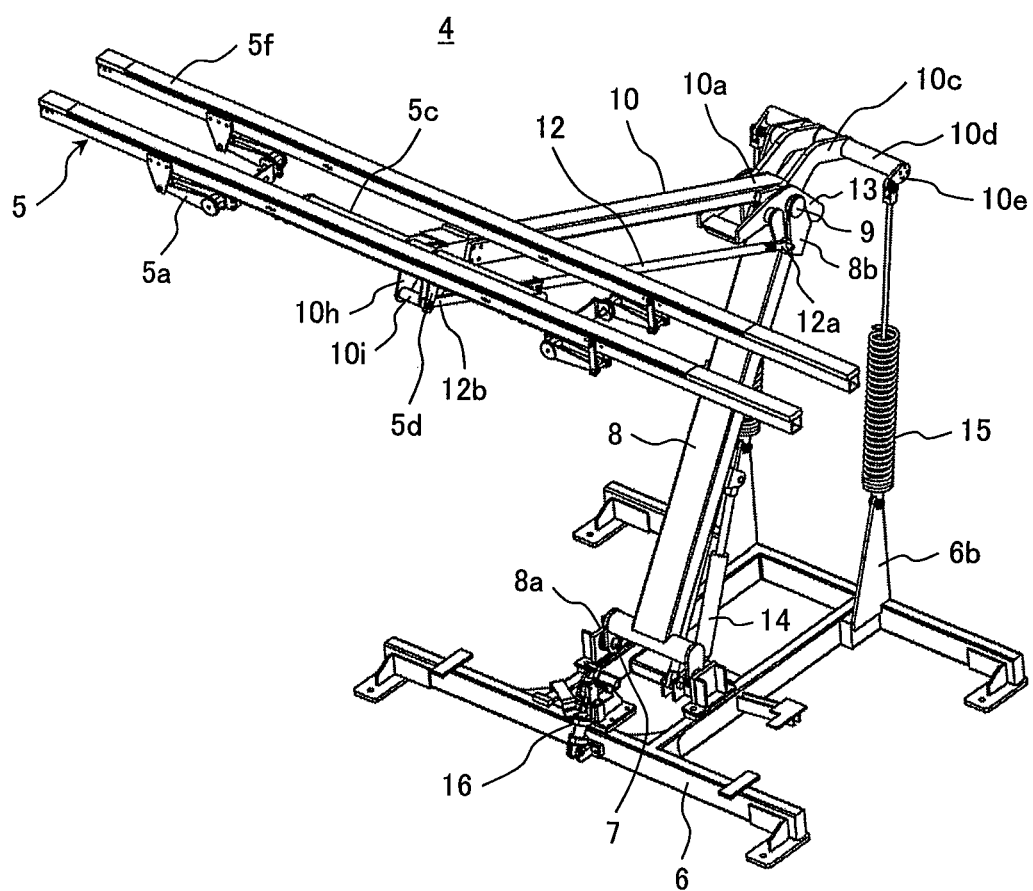
FIG. 3 is an overall perspective view of the pantograph device shown in FIG. 2, as viewed from the opposite side to FIG. 2.
Figure 4:
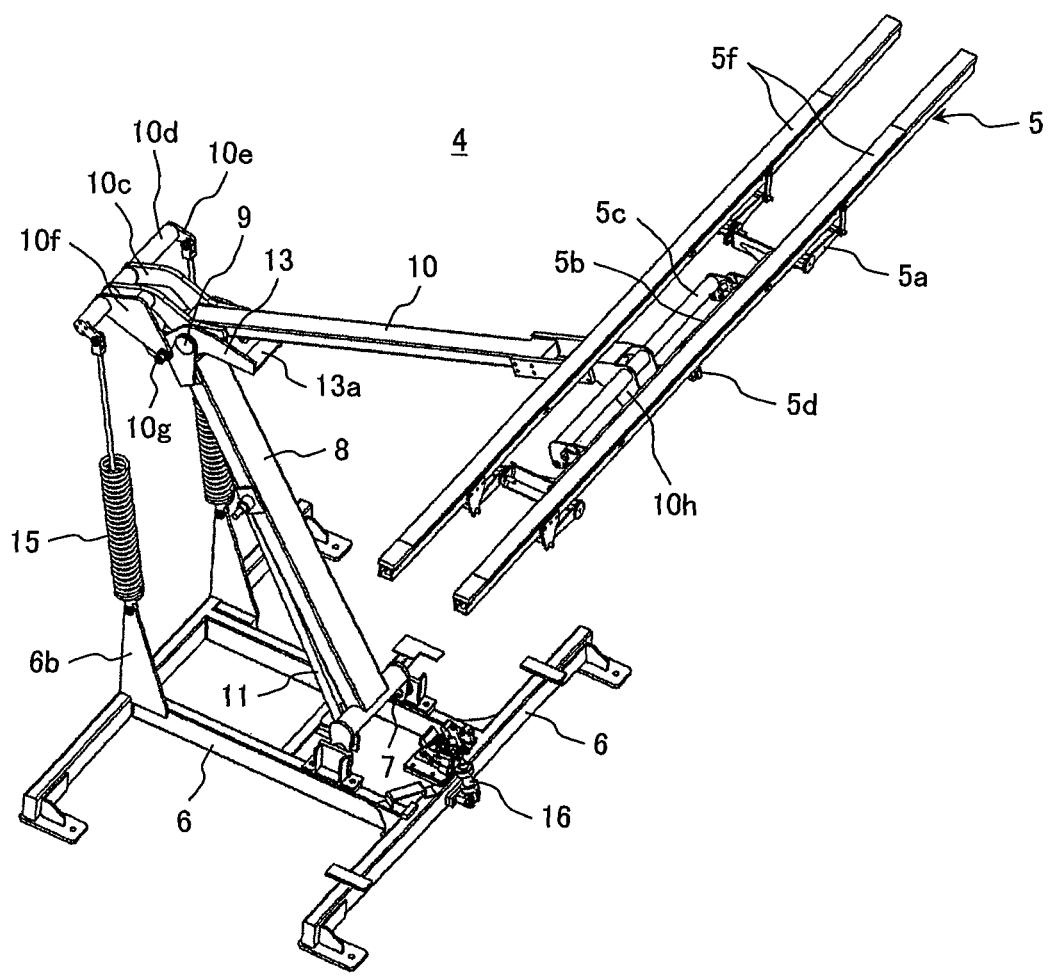
FIG. 4 is an overall perspective view of the pantograph device mounted on the trolley-type truck shown in FIG. 1, as viewed from the right front side.
Figure 5:
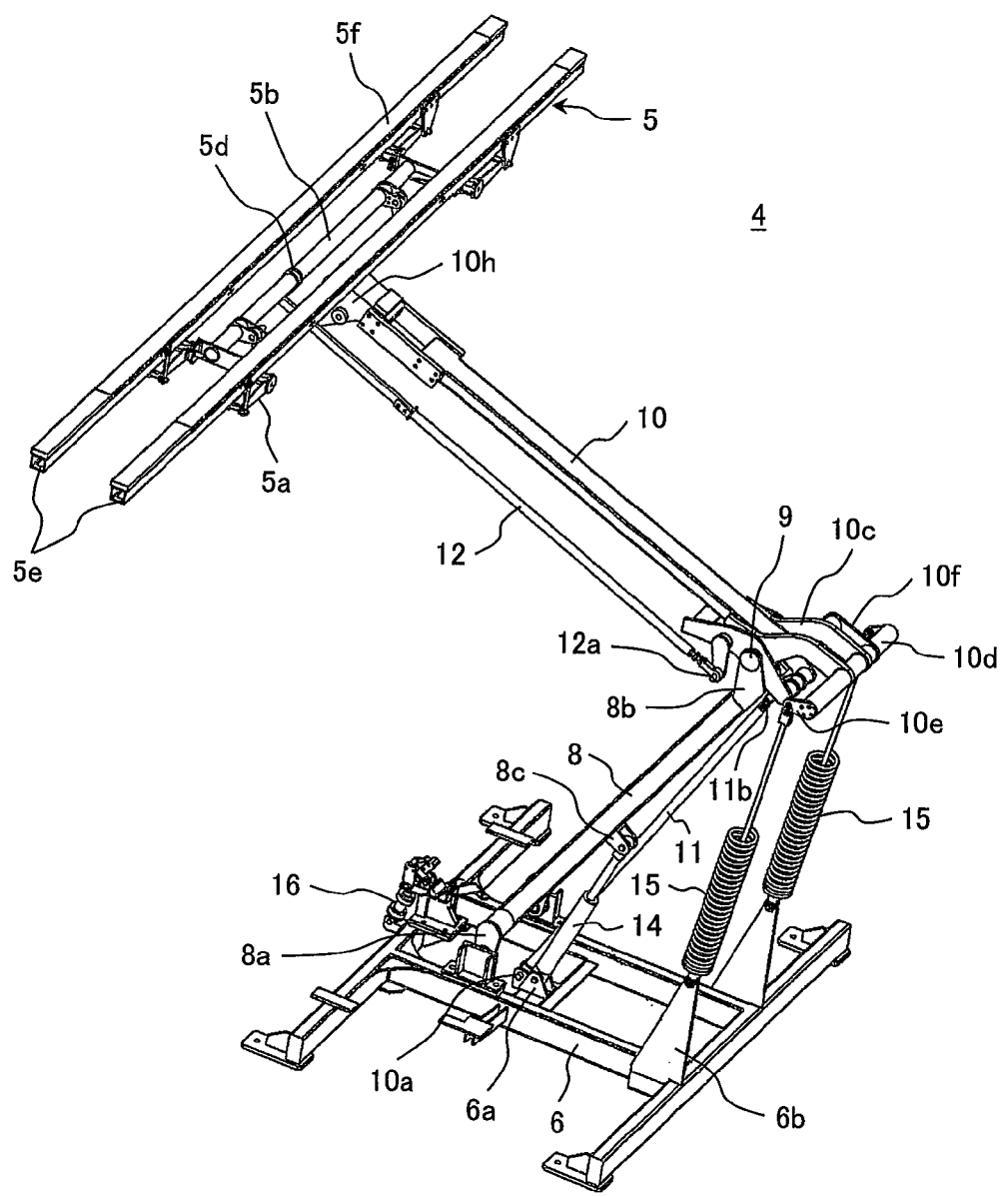
FIG. 5 is an overall perspective view of the pantograph device shown in FIG. 4, as viewed from the opposite side to FIG. 4.

FIG. 2 to FIG. 5 are perspective views illustrating the overall structure of the pantograph device 4. FIG. 2 is an overall perspective view as viewed from the left front side; FIG. 3 is an overall perspective view of the pantograph device shown in FIG. 2, as viewed from the opposite side; FIG. 4 is an overall perspective view as viewed from the right front side; and FIG. 5 is an overall perspective view of the pantograph device shown in FIG. 4, as viewed from the opposite side. A description will be given to the overall configuration of the pantograph device in this embodiment with reference to these drawings.

In FIG. 2 to FIG. 5, Reference sign 6 denotes the base frame of the pantograph device 4 attached to the upper part of the deck 3 for mounting the pantograph shown in FIG. 1. The base end portion 8a (Refer to FIG. 3) of the bottom frame 8 of the pantograph device 4 is rockably attached to the upper part of the base frame 6 through a rocking support shaft 7 (Refer to FIG. 3 and FIG. 4). Therefore, the bottom frame 8 is erected and lowered about the rocking support shaft 7. The top end portion (upper end portion) 8b of the bottom frame 8 is provided with a connecting shaft 9 in parallel to the rocking support shaft 7; and the base end portion 10a of the top frame 10 is rockably coupled to the connecting shaft 9. The collector shoe 5 is rockably supported on the top end portion (upper end portion) 10b of the top frame 10 through the following: a shoe support 5a; a shoe support bar 5b (Refer to FIG. 5); a connecting shaft 5c (Refer to FIG. 4); and the like.

A lower balancing bar (parallel link) 11 (Refer to FIG. 2 and FIG. 5) is provided so as to constitute a parallel link mechanism together with the bottom frame 8; and an upper balancing bar (parallel link) 12 (Refer to FIG. 3 and FIG. 5) is provided so as to constitute a parallel link mechanism together with the top frame 10.

The lower balancing bar 11 has the base end portion 11a thereof rotatably attached to the base frame 6.

A parallel link receiver 13 is rotatably attached to the connecting shaft 9 provided at the top end portion 8b of the bottom frame 8; and the top end portion 11b of the lower balancing bar 11 is rotatably coupled to the parallel link receiver 13. Therefore, a parallel link mechanism is comprised of the bottom frame 8, the lower balancing bar 11, the base frame 6, and the parallel link receiver 13. Even when the bottom frame 8 makes erecting/lowering action, the parallel link receiver 13 is constantly kept in an identical posture (similar posture).

As shown in FIG. 3 and FIG. 5, the upper balancing bar 12 has the base end portion 12a thereof rotatably attached to the parallel link receiver 13; and the top end portion 12b thereof is rotatably coupled to a bracket 5d provided at the shoe support bar 5b of the collector shoe 5. Therefore, a parallel link mechanism is comprised of the top frame 10, the upper balancing bar 12, the parallel link receiver 13, and the collector shoe 5 (especially, the bracket 5d, the shoe support bar 5b, and the connecting shaft 5c). Even when the bottom frame 8 and the top frame 10 make erecting/lowering action, the collector shoe 5 is constantly held in an identical posture (for example, horizontal position). As a result, even when the pantograph device 4 makes ascending action or descending action, the collector shoe 5 is constantly held in an identical posture (for example, horizontal position). This makes it possible to bring a sliding plate 5f provided on the upper face of the shoe 5e of the collector shoe 5 into even contact with the overhead wire 1.

Reference sign 14 denotes a hydraulic cylinder (actuator). As illustrated in FIG. 5, the base end thereof is attached to a bracket 6a of the base frame 6 and the top end thereof is coupled to a bracket 8c provided on the bottom frame 8. Therefore, when the hydraulic cylinder 14 is expanded, the bottom frame 8 is erected (raised); and when the hydraulic cylinder 14 is shrunk, the bottom frame 8 is toppled downward.

Reference sign 15 denotes a spring for raising the top frame 10. One end side (lower end side) of this spring 15 is joined with a bracket 6b provided on the base frame 6 and the other end side (upper end side) thereof is joined to an arm portion 10c through the following: a spring receiving bar 10d; and a spring receiving bracket 10e. The arm portion 10c is configured integrally with the top frame 10 and is so provided that the arm portion 10c is extended to the opposite side with the connecting shaft 9 in-between. In this example, the bracket 6b is installed on the side where the bottom frame 8 is toppled relative to the position of the rocking support shaft 7. By erecting the bottom frame 8 by the hydraulic cylinder 14, the distance between the brackets 6b and 10e coupled with each other through the spring 15 is increased. This makes it possible to erect the bottom frame 8 to increase the tensile force produced in the spring 15.

Therefore, by expanding the hydraulic cylinder 14 to raise the bottom frame 8 upward, the spring 15 is expanded and the tensile force thereof is increased. As a result, it is possible to pull the arm portion 10c downward to raise the top frame 10 upward about the connecting shaft 9 as a fulcrum. A more specific description will be given. The rotation moment (counterclockwise rotation moment in FIG. 2) about the connecting shaft 9 due to the tensile force of the spring 15 is made larger than the following rotation moment by erecting the bottom frame 8 to a predetermined position: the rotation moment (clockwise rotation moment in FIG. 2) about the connecting shaft 9 due to gravity acting on the top frame 10. With this configuration, the top frame 10 can be automatically lifted upward in conjunction with the erection of the bottom frame 8.

Conversely, by shrinking the hydraulic cylinder 14 to topple the bottom frame 8 downward, the spring 15 is also shrunk and the tensile force thereof is reduced. When the rotation moment about the connecting shaft 9 due to the tensile force of the spring 15 becomes smaller than the rotation moment about the connecting shaft 9 due to gravity acting on the top frame 10, the top frame 10 is toppled downward. In this embodiment, however, the parallel link receiver 13 is provided with a top frame receiving section (stopper) 13a. The top frame receiving section 13a prevents the top frame 10 from being directed downward more than in the substantially horizontal position.

Reference sign 10f in FIG. 4 and the like denotes a bracket for damper integrally attached to the arm portion 10c. Though not shown in the drawings, the top end side of a damper device the base end side of which is fixed on the base frame 6 is attached to the damper anchoring portion 10g of this bracket 10f. This damper device suppresses the top frame 10 from vibrating.

Reference sign 16 in FIG. 2 to FIG. 5 denotes a hook device. When the pantograph device 4 is folded and brought out of operation, the hook device fixes the collector shoe 5 of the pantograph device 4 on the base frame 6.

Figure 6:
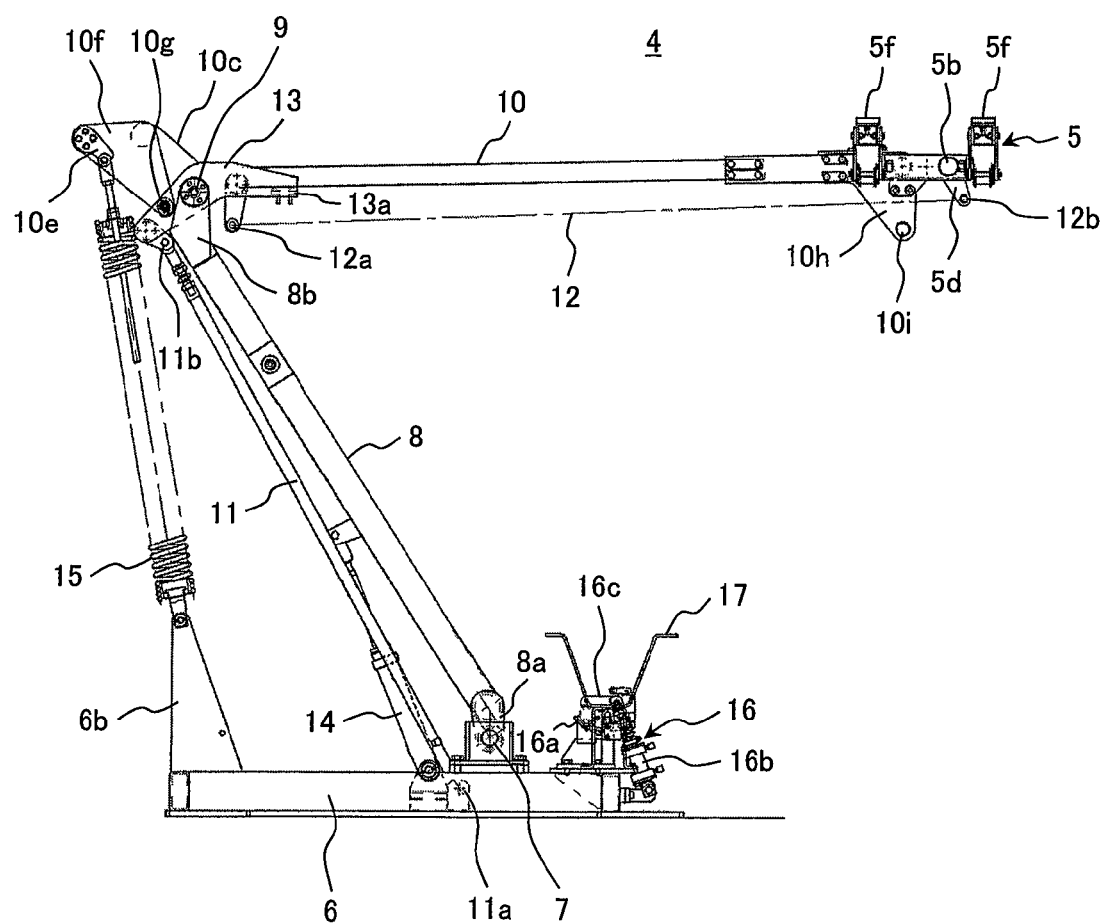
FIG. 6 is a front view of the pantograph device shown in FIG. 2, illustrating a state in which only the bottom frame is erected.
Figure 7:
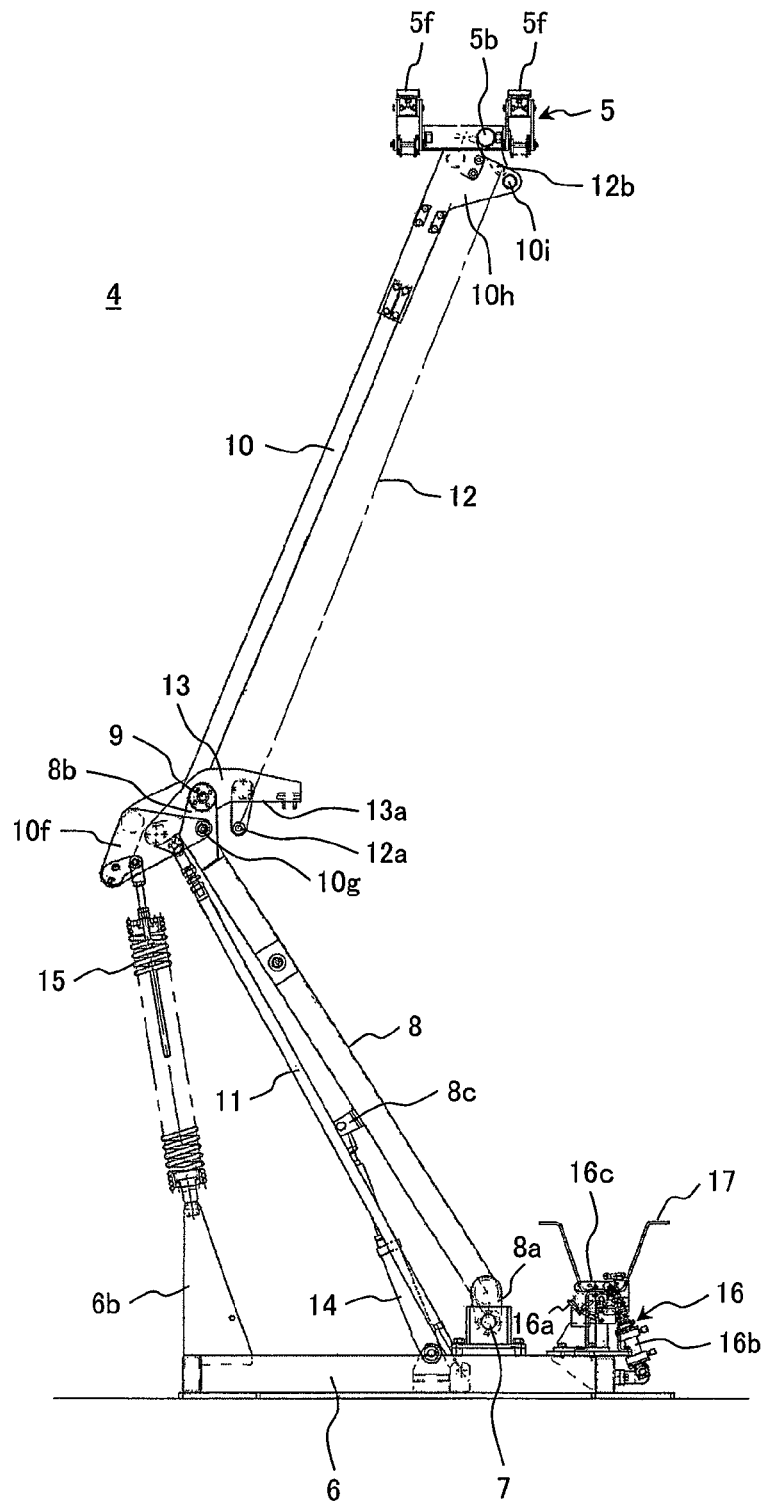
FIG. 7 is a drawing illustrating a state in which the top frame is also erected, following the state shown in FIG. 6.

A description will be given to the operation of the pantograph device 4 in this embodiment with reference to the front views in FIG. 6 and FIG. 7. FIG. 6 shows a state in which only the bottom frame 8 is erected; and FIG. 7 shows a state in which the top frame 10 is also erected (raised), following the state in FIG. 6. In these drawings, items marked with the same reference signs as in FIG. 1 to FIG. 5 are the same or equivalent items.

FIG. 6 shows a state in which only the bottom frame 8 is raised by expanding the hydraulic cylinder 14. As shown in FIG. 6, by raising the bottom frame 8 by the hydraulic cylinder 14, the spring 15 is accordingly expanded and the tensile force thereof can be increased. By expanding the hydraulic cylinder 14, the bottom frame 8 is gradually raised. When the rotation moment due to the tensile force of the spring 15 overcomes the rotation moment due to gravity acting on the top frame 10, the following takes place as shown in FIG. 7: the top frame 10 is raised upward about the connecting shaft 9 as a fulcrum by the spring 15.

In conjunction with the rising action of the top frame 10, the spring 15 is shrunk and thus the tensile force of the spring is reduced. When the rotation moment due to the tensile force of the spring 15 is balanced with the rotation moment due to gravity acting on the top frame 10, the ascent of the top frame 10 is stopped.

Figure 10:
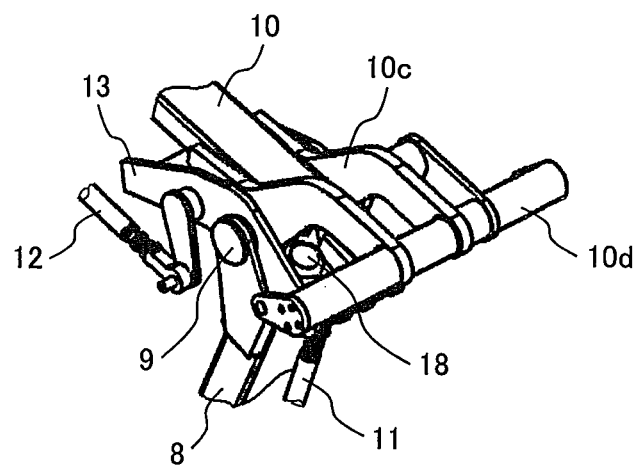
FIG. 10 is a partial perspective view of the vicinity of a connecting shaft as viewed from the obliquely upper side.
Figure 11:
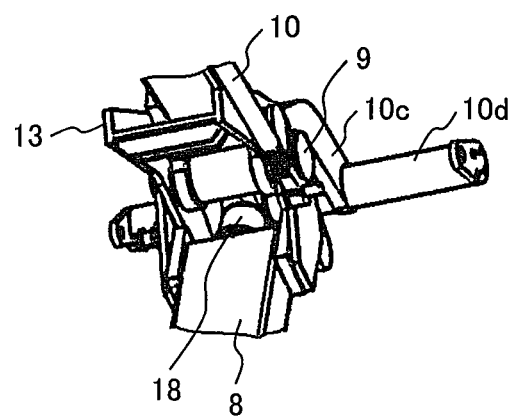
FIG. 11 is a partial perspective view of the vicinity of the connecting shaft as viewed from the obliquely lower side.

In this embodiment, however, the top end portion of the bottom frame 8 is provided with a rubber stopper 18 as shown in the partial perspective views of the vicinity of the connecting shaft 9 in FIG. 10 and FIG. 11. The top frame 10 hits the stopper provided on the bottom frame 8 in a position lower than the position in which the ascent of the top frame 10 is stopped and the ascent thereof is stopped there.

The height at which the collector shoe 5 is located when the top frame 10 is in this state is taken as thrust-off height. FIG. 7 shows a state in which the collector shoe 5 is located at the thrust-off height. The thrust-off height is higher than the working range, which is a range within which the collector shoe 5 of the pantograph device 4 fluctuates in contact with the overhead wire 1. Even at the maximum working height in the working range, the collector shoe 5 can be pressed against the overhead wire 1 with appropriate predetermined pressing force.

When the hydraulic cylinder 14 is shrunk to gradually topple the bottom frame 8 from the state shown in FIG. 7, the spring 15 is gradually shrunk. As a result, the rotation moment due to the tensile force of the spring 15 becomes smaller than the rotation moment due to gravity acting on the top frame 10. When this state is established, the top frame 10 descends and is about to rotate to be directed downward more than in the horizontal position. In this embodiment, however, the top frame 10 is received by the top frame receiving section 13a of the parallel link receiver 13 as mentioned above and is kept in the substantially horizontal state. Kept substantially horizontal, the top frame 10 is moved downward in conjunction with the descending action of the bottom frame 8 and the pantograph device 4 is folded.

In FIG. 6 and FIG. 7, the upper balancing bar 12 is indicated by an alternate long and short dashed line. In these drawings, Reference sign 17 denotes a shoe receiver that supports the collector shoe 5 when the pantograph device 4 is folded. The shoe receiver 17 is provided on the base frame 6 at two points ahead of and behind the hook device 16 in-between (in the direction of the length of the collector shoe 5) so that both sides of the lower face of collector shoe 5 can be supported.

In addition, a bracket 10h provided on the top end side of the top frame 10 is provided with a pantograph fixing pipe 10i. The pantograph fixing pipe 10i is received by the receiving section 16a of the hook device 16 provided on the base frame 6 when the pantograph device 4 is folded. Further, the pantograph fixing pipe 10i is firmly fixed by a hook section 16c rotated by a hydraulic cylinder 16b of the hook device 16. This prevents the pantograph device 4 from being violently vibrated or largely jolted and damaged even when the truck 2 travels on a rough road in the non-trolley mode.

Figure 8:
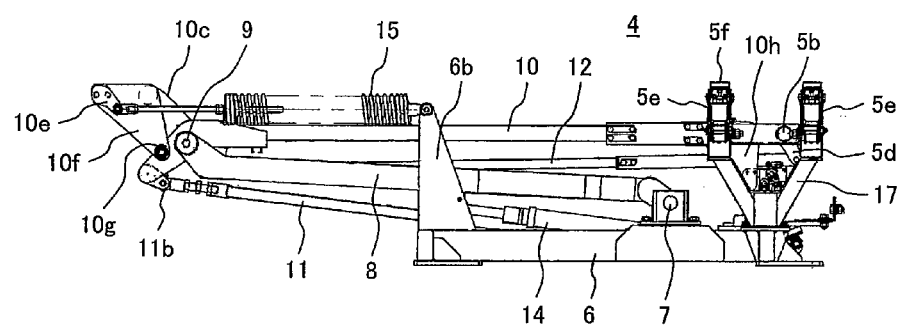
FIG. 8 is a front view illustrating the pantograph device shown in FIG. 2 as is folded.

FIG. 8 is a front view of the pantograph device 4 described with reference to FIG. 2 to FIG. 7 as is folded. In FIG. 8, items marked with the same reference signs as in FIG. 1 to FIG. 7 are the same items and a detailed description thereof will be omitted.

When the pantograph device 4 is folded, as mentioned above, the lower face of the shoe 5e of the collector shoe 5 is placed on the upper faces of the shoe receivers 17 installed on the base frame 6.

With the above-mentioned configuration of this embodiment, the following can be implemented when the truck can travel in the trolley mode with the collector shoe 5 of the pantograph device 4 in contact with the overhead wire 1 as shown in FIG. 1: the collector shoe 5 is pressed against the overhead wire 1 through the top frame 10 by the energizing force of the spring 15 shown in FIG. 2 to FIG. 7. The collector shoe 5 of the pantograph device 4 can be moved up or down according to changes in the distance between the overhead wire 1 and the dump truck 2.

Figure 9:
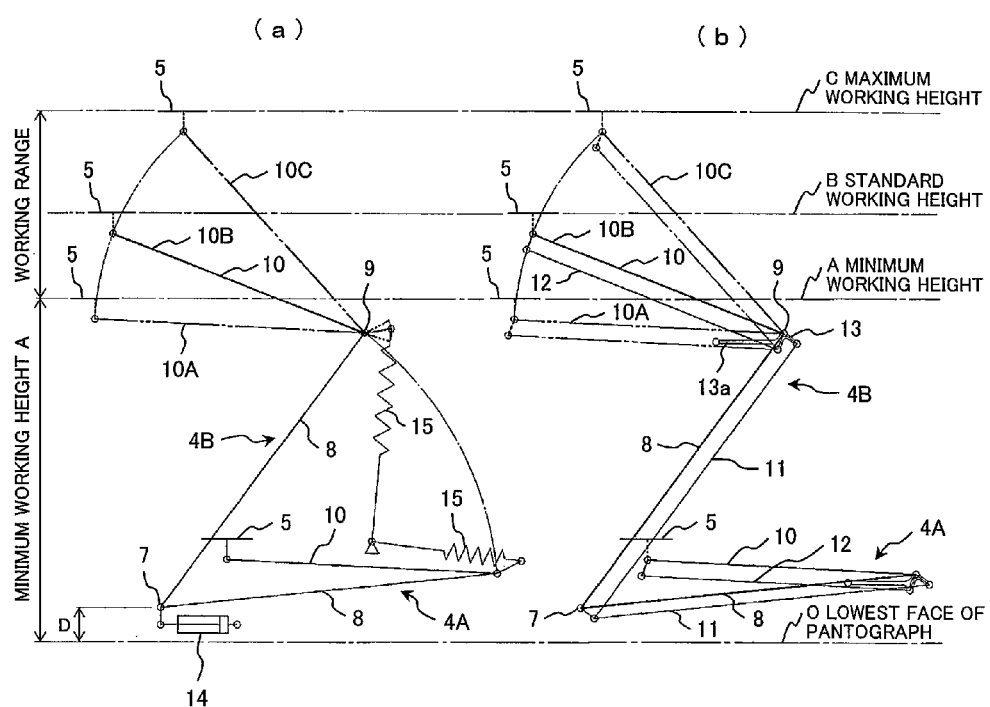
FIG. 9 is a drawing illustrating the ascending/descending action of the pantograph device in Embodiment 1 of the present invention.

FIG. 9 explains the ascending/descending action of the above-mentioned pantograph device 4 in Embodiment 1. Figure (a) of FIG. 9 explains the functions of the spring 15 and the parallel links (the lower balancing bar 11 and the upper balancing bar 12) are omitted; Figure (b) explains the functions of the parallel links (the lower balancing bar 11 and the upper balancing bar 12) and the hydraulic cylinder 14 and the spring 15 are omitted. In FIG. 9, items marked with the same reference signs as in FIG. 2 to FIG. 8 are the same or equivalent items.

In Figure (a) and Figure (b), the horizontal lines indicated by alternate long and short dashed lines respectively indicate the following: the lowest face O of the pantograph device 4 (that is, the lower face of the base frame 6; equivalent to the height of the upper face of the deck 3 for mounting the pantograph, shown in FIG. 1; minimum working height A; standard working height B; and maximum working height C. The minimum working height A denotes the height of the position down to which the collector shoe 5 of the pantograph device 4 can descend while the trolley-type truck is traveling in the trolley mode from the lowest face O of the pantograph device 4; the maximum working height C denotes the height up to which the collector shoe 5 of the pantograph device 4 can ascend while the trolley-type truck is traveling in the trolley mode from the lowest face O of the pantograph device 4; and the standard working height B denotes the standard height position of the collector shoe 5 of the pantograph device 4 while the trolley-type truck is traveling in the trolley mode from the lowest face O of the pantograph device 4. The standard working height B is the height in the substantially intermediate position between the minimum working height A and the maximum working height C.

When the trolley-type truck travels in the trolley mode, the height position of the collector shoe 5 of the pantograph device 4 fluctuates between the minimum working height A and the maximum working height C with the standard working height B at the center. Thus the collector shoe 5 is constantly in contact with the overhead wire 1. The range between the minimum working height A and the maximum working height C is designated as the working range of the pantograph device 4.

In each of Figures (a) and (b), Reference sign 4A indicates the folded pantograph device 4 and 4B indicates the raised pantograph device 4. The installation position of the hydraulic cylinder 14 shown in Figure (a) is different from that shown in FIG. 2 to FIG. 8. However, the function of the bottom frame 8 being erected or lowered by the hydraulic cylinder 14 is not different.

First, a description will be given with reference to Figure (a). The bottom frame 8 is rotated about the rocking support shaft 7 as a fulcrum. The rocking support shaft 7 is provided at the height D from the lowest face O of the pantograph device 4.

The top frame 10 is rotated about the connecting shaft 9, provided at the top end of the bottom frame 8, as a fulcrum and the top frame 10 is provided on the top end side with the collector shoe 5. The pantograph device 4 gradually raises the bottom frame 8 from the folded state indicated by 4A to the state indicated by 4B by the hydraulic cylinder 14. The spring 15 in a laid state is accordingly raised and pulled and the tensile force thereof is increased. When the rotation moment due to the tensile force of the spring 15 overcomes the rotation moment due to gravity acting on the top frame 10, the following takes place: the top frame 10 is raised upward about the connecting shaft 9 as a fulcrum by the spring 15 and the collector shoe 5 ascends and is brought into contact with the overhead wire 1 (Refer to FIG. 1). When the collector shoe 5 is brought into contact with the overhead wire 1, the collector shoe 5 cannot ascend anymore; therefore, the collector shoe 5 is kept pressed against the overhead wire 1 by the spring 15.

The position of the solid line denoting the top frame 10 indicated by 10B indicates a state in which the collector shoe 5 is in contact with the overhead wire 1 at the standard working height B. The position of the alternate long and two short dashes line indicated by 10A indicates a state in which the collector shoe 5 is in contact with the overhead wire 1 at the minimum working height A. The position of the alternate long and two short dashes line indicated by 10O indicates a state in which the collector shoe 5 is in contact with the overhead wire 1 at the maximum working height C. That is, the collector shoe 5 is pressed against and in contact with the overhead wire 1 by the energizing force of the spring 15 and can fluctuate according to changes in the distance between the overhead wire 1 and the dump truck 2.

According to this embodiment, as mentioned above, the following can be implemented in the pantograph device 4 by raising the bottom frame 8 from the folded state indicated by 4A to the state indicated by 4B by the hydraulic cylinder 14: the tensile force of the spring 15 is increased; and the top frame 10 is automatically raised in conjunction therewith to cause the collector shoe 5 to ascend to the position where the collector shoe 5 is brought into contact with and pressed against the overhead wire 1. At a result, the trolley-type truck can be caused to travel in the trolley mode.

A description will be given to the descending action of the pantograph device 4. In the state (indicated by 4B), the collector shoe 5 is constantly pressed against and kept in contact with the overhead wire 1 by the tensile force of the spring 15 and the truck can travel in the trolley mode. The pantograph device 4 is folded and caused to transition to the non-trolley mode as indicated by 4A. In this case, first, the bottom frame 8 is gradually toppled by the hydraulic cylinder 14. The spring 15 is gradually contracted in conjunction therewith. When the rotation moment due to the tensile force of the spring 15 becomes smaller than the rotation moment due to gravity acting on the top frame 10, the following takes place: the top frame 10 descends to the position of the alternate long and two short dashes line indicated by 10A about the connecting shaft 9 as a fulcrum. When the bottom frame 8 is thereafter caused to further descend by the hydraulic cylinder 14, the pantograph device 4 is folded as indicated by 4A.

A description will be given to the functions of the parallel links (the lower balancing bar 11 and the upper balancing bar 12) with reference to Figure (b). In Figure (b), Reference sign 11 denotes the lower balancing bar; 12 denotes the upper balancing bar; 13 denotes the parallel link receiver; and 13a denotes the top frame receiving section of the parallel link receiver 13. The other items are the same as described with reference to Figure (a).

In the state, indicated by 4A, in which the pantograph device 4 is folded, the top frame receiving section 13a of the parallel link receiver 13 is kept substantially horizontal by the lower balancing bar 11. The top frame 10 is supported and held in the substantially horizontal position by the top frame receiving section 13a. As shown in the drawing, the collector shoe 5 is also held in the substantially horizontal position by the parallel link receiver 13 and the upper balancing bar 12 connected thereto.

When the bottom frame 8 is raised by the hydraulic cylinder 14, the top frame 10 is also raised by the tensile force of the spring 15 so that the collector shoe 5 is brought into contact with the overhead wire 1. However, the top frame receiving section 13a of the parallel link receiver 13 is held substantially horizontal by the lower balancing bar 11. As shown in the drawing, the collector shoe 5 is also held in the substantially horizontal position by the parallel link receiver 13 and the upper balancing bar 12 connected thereto. Further, the distance between the position of the overhead wire 1 and the dump truck 2 varies; and the rise angle of the top frame 10 is thereby caused to fluctuate within the range from the position indicated by 10A to the position indicated by 10C. Even when this occurs, the collector shoe 5 is held in the substantially horizontal position by the parallel link receiver 13 and the upper balancing bar 12 connected thereto and fluctuates.

When the pantograph device 4 is folded and caused to transition from the state indicated by 4B to the state indicated by 4A, the bottom frame 8 is toppled by the hydraulic cylinder 14. The tensile force of the spring 15 is reduced in conjunction therewith. When the rotation moment due to the tensile force of the spring 15 becomes smaller than the rotation moment due to gravity acting on the top frame 10, the following takes place: the top frame 10 descends to the position of the alternate long and two short dashes line indicated by 10A about the connecting shaft 9 as a fulcrum. The top frame 10 is about to rotate to a lower position but it is received and held in the substantially horizontal position by the top frame receiving section 13a. By causing the bottom frame 8 to further descend by the hydraulic cylinder 14, the pantograph device 4 is thereafter folded as indicated by 4A.

As described up to this point, the following is implemented by raising the bottom frame 8 of the pantograph device 4 from the folded state 4A shown in FIG. 9 as indicated by 4B in FIG. 9 by the hydraulic cylinder 14: the spring 15 is expanded and the tensile force thereof is increased. This makes it possible to cause the top frame 10 to automatically ascend to the thrust-off height position shown in FIG. 7. Therefore, it is possible to cause the trolley-type truck to travel in the trolley-mode in which the collector shoe 5 is pressed against the overhead wire 1 to collect a current. When the trolley-type truck is traveling in the trolley mode, the collector shoe 5 of the top frame 10 can be caused to ascend and descend relative to the base frame 6 by the energizing force of the spring 15 according to the following changes: changes in the distance between the overhead wire 1 and the trolley-type truck, that is, changes in the distance between the overhead wire 1 and the base frame 6 of the pantograph device 4.

Even when this ascending/descending action is being made, the posture of the collector shoe 5 is made constant by the above-mentioned parallel link mechanisms. The state of sliding between the sliding plate 5f placed on the upper face of the collector shoe 5 and the overhead wire 1 is thereby kept appropriate.

To fold the pantograph device 4, the bottom frame 8 is caused to gradually descend by the hydraulic cylinder 14. Thus the tensile force of the spring 5 is reduced and thus it is possible to cause the top frame 10 to automatically descend by the rotation moment gravity acting on the top frame 10 to fold the pantograph device 4.

According to this embodiment, as mentioned above, the following can be implemented by shrinking or expanding the hydraulic cylinder 14 to erect or topple the bottom frame 8: the tensile force of the spring 15 is thereby varied to cause the top frame 10 to automatically rise or topple. This makes it possible to cause the collector shoe 5 to ascend and bring the collector shoe 5 into contact with the overhead wire 1, or it is possible to fold the pantograph device 4 and cause the collector shoe 5 to descend and house the collector shoe 5.

Hereafter, a description will be given to the effects of the pantograph device of a trolley-type truck in this embodiment.

(1) Only the rotation moment due to weight acting on the top frame 10 acts on the spring 15. It is unnecessary to simultaneously bear the rotation moment due to the gravity of the bottom frame 8 which is twice to three times the weight of the top frame 10. That is, the spring force of the spring 15 only has to be capable of producing rotation moment larger than the rotation moment due to weight acting on the top frame 10 of the pantograph device 4. The spring force only has to be capable of ascent from the position where the collector shoe 5 is located at the minimum working height A to at least the following position: the position of the maximum working height C (preferably, the position of the thrust-off height higher than the maximum working height). Therefore, the spring force of the spring 15 only has to be, for example, ⅓ to ¼ or below as compared with the cases where the bottom frame 8 is supported together.

(2) Since the spring force of the spring 15 can be significantly reduced and it is unnecessary to use a strong spring, the collector shoe 5 can be pressed against the overhead wire 1 with appropriate force through the top frame 10. As a result, not only the amount of wear in the sliding plate 5f of the collector shoe 5 and the overhead wire 1 can be reduced. Since an excessive load is not imposed on the sliding plate 5f, the occurrence of cracking or chipping in the sliding plate 5f can also be reduced.

(3) It is possible to easily cause the collector shoe 5 to follow relatively great changes in the height of the overhead wire 1. A more specific description will be given. In this embodiment, when the trolley-type truck is caused to travel in the trolley mode, the bottom frame 8 is raised and held in the predetermined position by the hydraulic cylinder 14. Only the top frame 10 and the collector shoe 5 attached thereto fluctuate within the above-mentioned working range in accordance with changes in the distance between the position of the overhead wire 1 and the dump truck 2. Therefore, during traveling in the trolley mode, the heavy bottom frame 8 does not fluctuate (ascend or descend) in relation to the overhead wire position. Therefore, the weight of the fluctuating parts (the top frame 10 and the collector shoe 5) can be significantly reduced (for example, ⅓ to ¼ or so). As a result, the followability of the collector shoe 5 to the overhead wire 1 can be enhanced according to reduction in the weight of the fluctuating parts.

(4) The bottom frame 8 can be raised to the predetermined position by the hydraulic cylinder 14. Therefore, the spring 15 only has to be capable of the following: raising the top frame 10 from the high position where the connecting shaft 9 at the top end of the bottom frame 8 is located; and causing the top frame 10 to follow the position of the overhead wire 1 within the working range. Therefore, such a long and strong spring as described in Patent Literature 2 and as to be capable of causing a folded pantograph to ascend to the maximum working height or higher is unnecessary and a large winch is also unnecessary. Unlike the description in Patent Literature 1, the pantograph is not caused to ascend or descend by only the air cylinder and thus a large air cylinder is unnecessary as well.

(5) The tensile force of the spring 15 is increased by raising the bottom frame 8 to the predetermined position by the hydraulic cylinder 14 and the top frame 10 is raised by this spring force. Therefore, the drive mechanism for the pantograph device 4 can be simplified. As a result, it is possible to reduce the number and weight of parts and further reduce the number of wear parts through the reduction of movable portions.

According to this embodiment, as mentioned above, it is possible to obtain a wide movable range without use of a long and strong spring and obtain contact with an overhead wire with appropriate pressing force. Further, since it is unnecessary to move a heavy bottom frame up or down to changes in the height of the overhead wire, the following can be obtained: a pantograph device of a trolley-type truck in which the followability to overhead wires can be significantly enhanced without increasing pressing force.

In the description of the above embodiment, a case where a hydraulic cylinder is used for the actuator for causing the bottom frame of the pantograph device to ascend and descend is taken as an example. However, the actuator need not be a hydraulic cylinder and may be constructed of an air cylinder or the like utilizing air pressure.

REFERENCE SIGNS LIST

1 . . . overhead wire (trolley wire),
2 . . . dump truck,
3 . . . deck for mounting pantograph,
4 . . . pantograph device,
5 . . . collector shoe,
5a . . . shoe support,
5b . . . shoe support bar,
5c . . . connecting shaft,
5d . . . bracket,
5e . . . shoe,
5f . . . sliding plate,
6 . . . base frame,
6a, 6b . . . bracket,
7 . . . rocking support shaft,
8 . . . bottom frame,
8a . . . base end portion,
8b . . . top end portion,
9 . . . connecting shaft,
10 . . . top frame,
10a . . . base end portion,
10b . . . top end portion,
10c . . . arm portion,
10d . . . spring receiving bar,
10e . . . spring receiving bracket,
10f . . . bracket for damper,
10g . . . damper anchoring portion,
10h . . . bracket,
10i . . . pantograph fixing pipe,
11, 12 . . . parallel link (11: lower balancing bar, 12: upper balancing bar),
11a, 12a . . . base end portion,
11b, 12b . . . top end portion,
13 . . . parallel link receiver,
13a . . . top frame receiving section,
14 . . . hydraulic cylinder (actuator),
15 . . . spring,
16 . . . hook device,
16a . . . receiving section,
16b . . . hydraulic cylinder,
16c . . . hook section,
17 . . . shoe support,
18 . . . stopper.

The invention claimed is:

1. A pantograph device mounted on a trolley-type truck that is capable of traveling in either a trolley mode in which the truck travels on power obtained from an overhead wire or a non-trolley mode in which the truck travels without obtaining power from an overhead wire, the pantograph device comprising:
   a base frame;
   a bottom frame rotatably attached to the base frame;
   a top frame rotatably attached to a top end portion of the bottom frame through a connecting shaft;
   a collector shoe rotatably supported by a top end portion of the top frame;
   an actuator for erecting and lowering the bottom frame and that is attached to the base frame;
   said top frame having an arm portion extending opposite to the top end portion with the connecting shaft in between; and
   one or more tension springs, each respectively having a first end connected to the base frame and a second end connected to the base end portion of the top frame, and each of which causes the top frame to rotate upwardly with respect to the bottom frame about the connecting shaft, wherein a tensile force produced in the one or more springs is increased by erecting the bottom frame by the actuator and the top frame is rotated upward about the connecting shaft by the increased tensile force.

2. The pantograph device of a trolley-type truck according to claim 1, wherein when erecting the bottom frame to a predetermined position by the actuator, a rotational moment about the connecting shaft due to the tensile force of the one or more springs is made larger than a rotational moment about the connecting shaft due to gravity acting on the top frame and the top frame is automatically lifted upward.

3. The pantograph device of a trolley-type truck according to claim 1, further comprising:

a lower balancing bar that constitutes a first parallel link together with the bottom frame;

an upper balancing bar that constitutes a second parallel link together with the top frame; and a parallel link receiver rotatably provided on the connecting shaft, wherein a top end portion of the lower balancing bar is rotatably coupled to the parallel link receiver, a base end portion of the upper balancing bar is also rotatably coupled to the parallel link receiver, and, when the bottom frame is erected and lowered, the parallel link receiver is held in an identical posture.

4. The pantograph device of a trolley-type truck according to claim 3, wherein a top end portion of the upper balancing bar is rotatably coupled to the collector shoe, a parallel link mechanism is comprised of the top frame, the upper balancing bar, the parallel link receiver, and the collector shoe, and, when the bottom frame and the top frame are erected and lowered, the collector shoe is held in an identical posture.

5. The pantograph device of a trolley-type truck according to claim 3, wherein the parallel link receiver is provided with a top frame receiving section for preventing the top frame from being directed downward more than a substantially horizontal position.

6. The pantograph device of a trolley-type truck according to claim 4, wherein the one or more springs cause the collector shoe to ascend and descend within a working range from a minimum working height to a maximum working height, and to follow a the position of the overhead wire.

7. The pantograph device of a trolley-type truck according to claim 6, wherein, when the collector shoe is at the maximum working height, the one or more springs cause the collector shoe to press against the overhead wire with a predetermined pressing force.

8. The pantograph device of a trolley-type truck according to claim 1, wherein the first end side of each of the one or more springs are joined to one or more brackets provided on the base frame and the second end side of each of the one or more springs are joined to the arm portion which is configured integrally with the top frame so that the arm portion is extended to an opposite side with the connecting shaft in-between, the bottom frame is rotatably attached to the base frame through a rocking support shaft, and the one or more brackets are installed on a side of the base frame where the bottom frame is toppled relative to a position of the rocking support shaft.

9. The pantograph device of a trolley-type truck according to claim 1, wherein the truck is a dump truck for mines used for ore transportation or the like at mines.

10. The pantograph device of a trolley-type truck according to claim 2, further comprising:

a lower balancing bar that constitutes a parallel link together with the bottom frame;

an upper balancing bar that constitutes a parallel link together with the top frame; and a parallel link receiver rotatably provided on the connecting shaft, wherein a top end portion of the lower balancing bar is rotatably coupled to the parallel link receiver, a base end portion of the upper balancing bar is also rotatably coupled to the parallel link receiver, and, when the bottom frame makes ascending/descending action, the parallel link receiver is held in an identical posture.

11. The pantograph device of a trolley-type truck according to claim 1, wherein a base end of the actuator is attached to the base frame and a top end of the actuator is coupled to the base frame, and wherein the bottom frame is erected when the actuator is expanded, and the bottom frame is lowered when the actuator is shrunk.

12. The pantograph device of a trolley-type truck according to claim 1, further comprising:

a rocking support shaft which connects the base frame and the bottom frame; and one or more brackets which connect the first end of the respective one or more springs to the base frame, and the one or more brackets are disposed on a side of the base frame where the bottom frame is lowered relative to a position of the rocking support shaft, wherein the one or more brackets are disposed further from the rocking support shaft than a base end of the actuator which is attached to the base frame.

13. The pantograph device of a trolley-type truck according to claim 1, wherein the one or more springs comprise two springs which rotate the top frame upward about the connecting shaft.

* * * * *